(12) United States Patent
Depaz

(10) Patent No.: US 8,302,274 B1
(45) Date of Patent: Nov. 6, 2012

(54) BLADE REMOVAL ASSISTANCE TOOL SYSTEM

(76) Inventor: Dominique Depaz, Eustis, FL (US)

(*) Notice: Subject to any disclaimer, the term of this patent is extended or adjusted under 35 U.S.C. 154(b) by 428 days.

(21) Appl. No.: 12/660,553

(22) Filed: Mar. 1, 2010

(51) Int. Cl.
- *B25B 1/08* (2006.01)
- *B25B 3/00* (2006.01)
- *B25B 1/00* (2006.01)
- *B25B 1/04* (2006.01)
- *B25B 27/14* (2006.01)
- *B23P 19/04* (2006.01)

(52) U.S. Cl. .......... 29/268; 269/229; 269/3; 269/6; 269/238; 269/239; 29/253; 29/255; 29/261; 29/267; 29/278

(58) Field of Classification Search .......... 269/268, 269/229, 3, 6, 238, 239; 29/253, 255, 261, 29/267, 278
See application file for complete search history.

(56) References Cited

U.S. PATENT DOCUMENTS

| | | | | |
|---|---|---|---|---|
| 4,564,991 A | * | 1/1986 | Taylor | 29/426.5 |
| 4,736,544 A | | 4/1988 | Greenquist | |
| 4,882,960 A | | 11/1989 | Kugler | |
| 4,893,393 A | * | 1/1990 | Marshall | 29/237 |
| 4,956,905 A | | 9/1990 | Davidson | |
| 5,542,185 A | * | 8/1996 | Boda | 33/27.02 |
| 5,865,018 A | | 2/1999 | Wanic | |
| 6,272,724 B1 | | 8/2001 | Sterling et al. | |
| 6,715,194 B1 | | 4/2004 | Sterling et al. | |
| 6,796,111 B2 | | 9/2004 | Williams | |
| 7,152,326 B1 | | 12/2006 | Tyler | |
| 2003/0056378 A1 | * | 3/2003 | Okada | 33/27.031 |

* cited by examiner

*Primary Examiner* — Monica Carter
*Assistant Examiner* — Nirvana Deonauth

(57) ABSTRACT

A blade pipe has an exterior end and an interior end with a tube for receiving a lawnmower blade. A locking nut, threadedly received in the tube, retains the blade within the tube. A wrench pipe has an exterior end and an interior end with a recess adapted to receive a wrench. A threaded pivot pin extends radially from the wrench pipe adjacent to the recess. A slide has a blade end and a wrench end, an aperture adjacent to the blade end, and a pivot bolt extending through the aperture and threadedly received in the tube. The slide has a slot slidably receiving the pivot pin.

5 Claims, 3 Drawing Sheets

BLADE REMOVAL ASSISTANCE TOOL SYSTEM

BACKGROUND OF THE INVENTION

1. Field of the Invention

The present invention relates to a blade removal assistance tool system and more particularly pertains to removing locking nuts from mowing blade shafts, in a safe, convenient and economical manner.

2. Description of the Prior Art

The use of blade removing tools of known designs and configurations is known in the prior art. More specifically, blade removing tools of known designs and configurations previously devised and utilized for the purpose of removing mower blades are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 7,152,326 to Tyler issued Dec. 26, 2006 discloses a Rotary Blade Holding Tool. U.S. Pat. No. 6,796,111 to Williams issued Sep. 28, 2004 discloses a Blade Holding Assembly for Rotary Cutting Machine. U.S. Pat. No. 6,718,194 to Sterling et al. issued Apr. 6, 2004 discloses a Blade Removing Tool for Rotary Lawn Mowers. U.S. Pat. No. 6,272,724 to Sterling et al. issued Aug. 14, 2001 discloses a Blade Removing Tool for Rotary Lawn Mowers. U.S. Pat. No. 5,865,018 to Wanic issued Feb. 2, 1999 discloses a Cutter Blade Removal Tool. U.S. Pat. No. 4,956,905 to Davidson issued Sep. 18, 1990 discloses a Tool for Holding a Rotatable Lawn Mower Blade. U.S. Pat. No. 4,736,544 to Greenquist issued Apr. 12, 1988 discloses a Blade Holder for Sharpening Lawnmower Blades. Lastly, U.S. Pat. No. 4,881,960 issued Nov. 28, 1989 to Kugler discloses a Lawn Mower Blade Lock.

While these devices fulfill their respective, particular objectives and requirements, the aforementioned patents do not describe a blade removal assistance tool system that allows removing locking nuts from mowing blade shafts, in a safe, convenient and economical manner.

In this respect, the blade removal assistance tool system according to the present invention substantially departs from the conventional concepts and designs of the prior art, and in doing so provides an apparatus primarily developed for the purpose of removing locking nuts from mowing blade shafts, in a safe, convenient and economical manner.

Therefore, it can be appreciated that there exists a continuing need for a new and improved blade removal assistance tool system which can be used for removing locking nuts from mowing blade shafts, in a safe, convenient and economical manner.

In this regard, the present invention substantially fulfills this need.

SUMMARY OF THE INVENTION

In view of the foregoing disadvantages inherent in the known types of blade removing tools of known designs and configurations now present in the prior art, the present invention provides an improved blade removal assistance tool system. As such, the general purpose of the present invention, which will be described subsequently in greater detail, is to provide a new and improved blade removal assistance tool system and method which has all the advantages of the prior art and none of the disadvantages.

To attain this, the present invention essentially comprises a lawn mower having a blade 16 rotatable in a horizontal plane. A locking nut removably couples the blade to the lawn mower. The blade is rotatable about a vertical axis of rotation. Half of the total length of the blade extends from each side of the locking nut.

Next provided is a wrench. The wrench has a handle end and a working end. A blade pipe has an exterior end and an interior end. The exterior end is adapted to be held by a user. The interior end has first and second rectangular tubes. The tubes are adapted to receive and support the blade. A blade supporting bolt is threadedly received in the first tube and is adapted to retain the blade within the tubes. A downwardly facing threaded aperture is provided in the first tube.

Next, a wrench pipe is provided. The wrench pipe has an exterior end and an interior end. The exterior end is adapted to be held by a user. The interior end has an axial recess adapted to receive and support the exterior end of the wrench. A wrench supporting bolt is threadedly received in the wrench pipe and is adapted to retain the wrench within the recess. A threaded pivot pin extends radially upwardly from the wrench pipe adjacent to the recess. A socket support extends upwardly from the wrench pipe adjacent to the pivot pin. A socket is removably received on the support.

Next provided is a flat slide. The slide has a blade end and a wrench end. The slide has a slide aperture adjacent to the blade end. A pivot bolt extends radially upwardly through the slide aperture and is received in the downwardly facing threaded aperture of the first rectangular tube. The slide has a slot between the wrench end and the aperture. The slot slidably receives the pivot pin. In this manner, motion of the exterior end of the blade pipe and the exterior end of the wrench pipe toward each other will effect pivoting of the blade pipe and the wrench around the locking nut with the concurrent sliding of the pivot pin within the slot along with the loosening of the locking nut with respect to the blade.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved blade removal assistance tool system which has all of the advantages of the prior art blade removing tools of known designs and configurations and none of the disadvantages.

It is another object of the present invention to provide a new and improved blade removal assistance tool system which may be easily and efficiently manufactured and marketed.

It is further object of the present invention to provide a new and improved blade removal assistance tool system which is of durable and reliable constructions.

An even further object of the present invention is to provide a new and improved blade removal assistance tool system which is susceptible of a low cost of manufacture with regard to both materials and labor, and which accordingly is then susceptible of low prices of sale to the consuming public, thereby making such blade removal assistance tool system economically available to the buying public.

Even still another object of the present invention is to provide a blade removal assistance tool system for removing locking nuts from mowing blade shafts, in a safe, convenient and economical manner.

Lastly, it is an object of the present invention to provide a new and improved blade removal assistance tool system with a blade pipe having an exterior end and having an interior ends with a tube for receiving a lawnmower blade. A locking nut, threadedly received in the tube, retains the blade within the tube. A wrench pipe has an exterior end and an interior end with a recess adapted to receive a wrench. A threaded pivot pin extends radially from the wrench pipe adjacent to the recess. A slide has a blade end and a wrench end, an aperture adjacent to the blade end, and a pivot bolt extending through the aperture and threadedly received in the tube. The slide has a slot slidably receiving the pivot pin.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
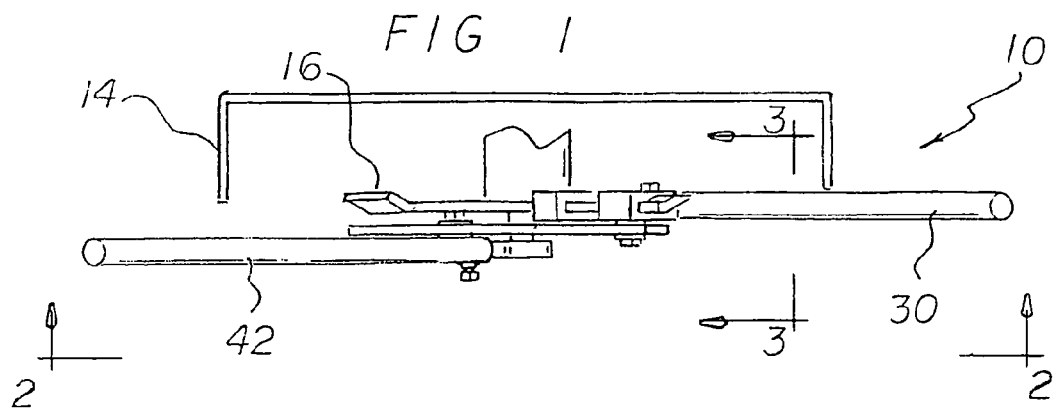
FIG. 1 is a front elevational view of a blade removal assistance tool system constructed in accordance with the principles of the present invention.
Figure 2:
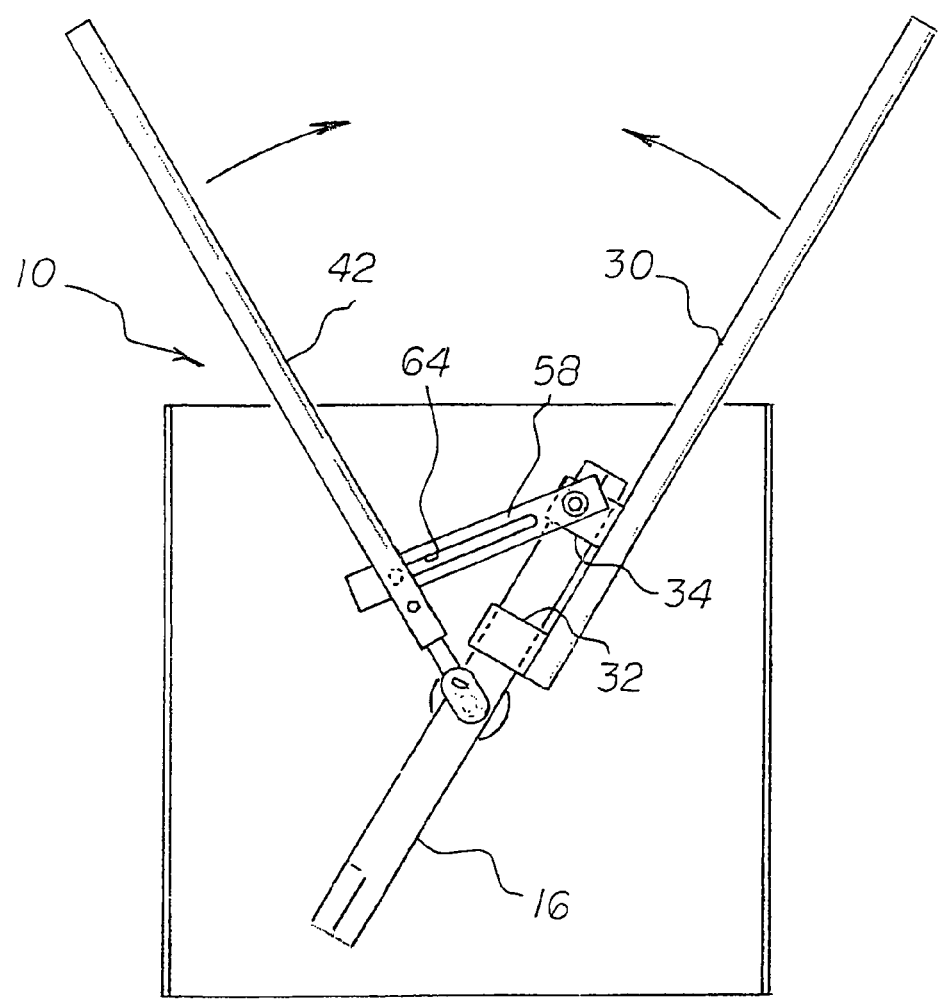
FIG. 2 is a bottom view of the system taken along line 2-2 of FIG. 1.
Figure 3:
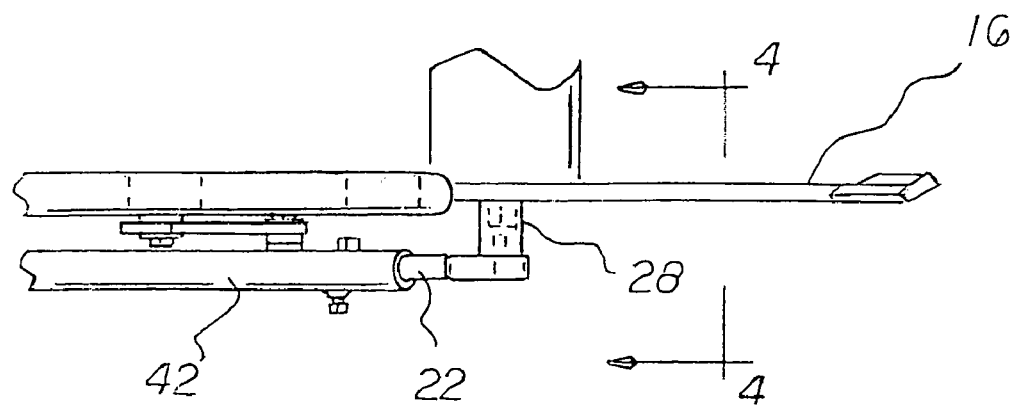
FIG. 3 is a cross-sectional view of the system taken along line 3-3 of FIG. 1.
Figure 4:
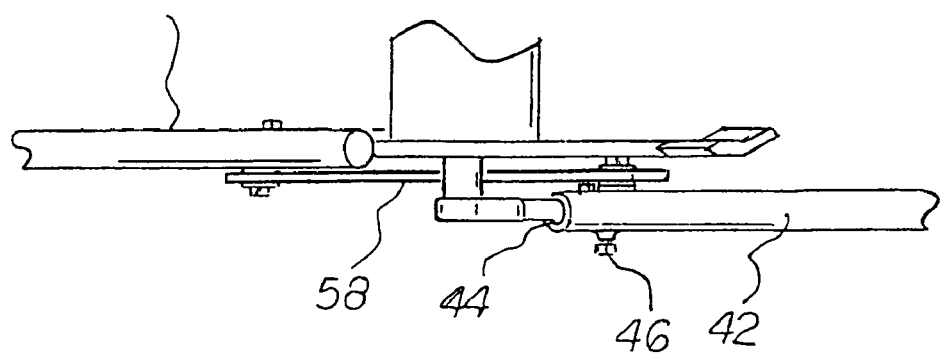
FIG. 4 is a cross-sectional view of the system taken along line 4-4 of FIG. 3.
Figure 5:
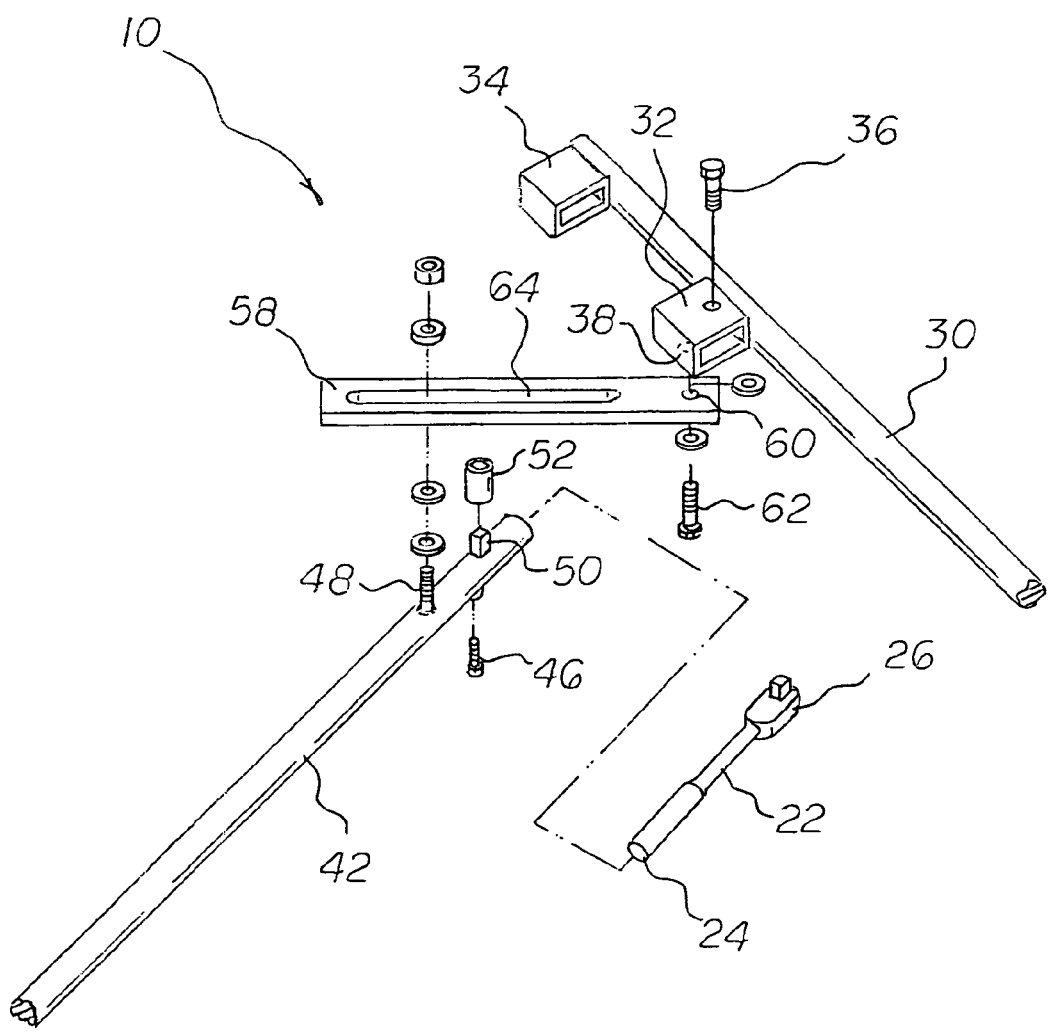
FIG. 5 is an exploded perspective illustration of the system shown in the prior figures.

With reference now to the drawings, and in particular to FIG. 1 thereof, the preferred embodiment of the new and improved blade removal assistance tool system embodying the principles and concepts of the present invention and generally designated by the reference numeral 10 will be described.

The present invention, the blade removal assistance tool system 10 is comprised of a plurality of components. Such components in their broadest context include a blade pipe, a wrench pipe, and a slide. Such components are individually configured and correlated with respect to each other so as to attain the desired objective.

The blade removal assistance tool system 10 of the present invention is for removing locking nuts from mowing blade shafts. The removing is done in a safe, convenient and economical manner. First provided is a lawn mower 14 having a blade 16 rotatable in a horizontal plane. A locking nut 18 removably couples the blade to the lawn mower. The blade is rotatable about a vertical axis of rotation. Half of the total length of the blade extends from each side of the locking nut.

Next provided is a wrench 22. The wrench has a handle end 24 and a working end 26.

A blade pipe 30 is next provided. The blade pipe has an exterior end and an interior end. The exterior end is adapted to be held by a user. The interior end has first and second rectangular tubes 32, 34. The tubes are adapted to receive and support the blade. A blade supporting bolt 36 is threadedly received in the first tube and is adapted to retain the blade within the tubes. A downwardly facing threaded aperture 38 is provided in the first tube.

Next, a wrench pipe 42 is provided. The wrench pipe has an exterior end and an interior end. The exterior end is adapted to be held by a user. The interior end has an axial recess 44 adapted to receive and support the exterior end of the wrench. A wrench supporting bolt 46 is threadedly received in the wrench pipe and is adapted to retain the wrench within the recess. A threaded pivot pin 48 extends radially upwardly from the wrench pipe adjacent to the recess. A socket support 50 extends upwardly from the wrench pipe adjacent to the pivot pin. A socket 52 is removably received on the support.

Next provided is a flat slide 58. The slide has a blade end and a wrench end. The slide has a slide aperture 60 adjacent to the blade end. A pivot bolt 62 extends radially upwardly through the slide aperture and is received in the downwardly facing threaded aperture 38 of the first rectangular tube. The slide has a slot 64 between the wrench end and the aperture. The slot slidably receives the pivot pin. In this manner, motion of the exterior end of the blade pipe and the exterior end of the wrench pipe toward each other will effect pivoting of the blade pipe and the wrench around the locking nut with the concurrent sliding of the pivot pin within the slot along with the loosening of the locking nut with respect to the blade.

A number of patents address means of holding mowing blades fixed so that a wrench can be used to unscrew the nut, which holds the blade against the drive shaft. These inventions apply to small push mowers, which can be easily inverted; and the nut holding the blade can be unscrewed without heavy torque with a ratchet or wrench. However, in the case of large mowing decks, such as those with 5 feet to 6 feet wide cuts, holding 3 blades and attached as an implement behind a large riding tractor, the removal of mowing blades can be a very complicated process. One of the reasons is that the mowing deck is usually lifted hydraulically at an angle of about 30 degrees and a height of 2 to 3 feet at the rear, thereby hindering access. Furthermore, with every use, the heavy blades tighten against the drive shaft, requiring extreme force to untwist the nut. Such torque cannot be obtained unless some lever action is provided, for example, placing a long pipe over the ratchet a wrench. However, even if the blades are held fixed by anyone of many mechanism, the operator would still have to crawl underneath the deck to attach the wrench or ratchet and find a way to hold it tight around the nut, so that it would not fall to the ground, while applying force against any extension around that wrench or ratchet.

The present invention addresses both the means of securing the blades from rotating and a means of unscrewing the nut holding the blade to the drive shaft all in one apparatus. The tool consists of two steel pipes, preferably 4 feet or greater in length and 1.0 to 1.5 inches in diameter. The pipes are held together by a steel slide bolted to each pipe. Slide allows for movement in 3 axis. Two rectangular pipes, cross section, at least 1.5" high by at least 2.5 inches welded to the right pipe handle, and set 6 to 10 inches apart provide the support of the assembly around the mowing blade. Each of the blade holders have 1 to 2 threaded bolt opening at the top and bottom, so that the apparatus can be tightened to the blades. This prevents the apparatus from rotating, thereby ensuring that the socket holder is vertical underneath the nut holding the blade to the drive shaft. The second handle not only provides support for the first handle, which carries the wrench/ratchet and the socket, but also allows for the blade to be held in place by the operator.

Depending on the tightness of the slide to the pipes and the tightness of the bolts in holders against the mowing blades, vertical and lateral movement can be obtained to adjust alignment of socket or wrench/ratchet.

Loosening the blade nut consists of 2 steps. First, the socket is placed on the ½x½ socket holder, welded to the pipe. The operator moves the first handle toward the second handle to initiate the first few degrees of nut rotation, loosening the grip of the nut. Second, once the nut is loose, the first pipe is adjusted so that the wrench or ratchet can be inserted in the nut and loosening continued.

It is possible to go directly to step 2 only if using a large, high quality ratchet. The inventor has broken numerous ratchets due to the enormous torque in trying to simplify the steps.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A blade removal assistance tool system comprising:
   a blade pipe having exterior and interior ends, the interior end having a tube for receiving a lawnmower blade, a locking nut threadedly received in the tube to retain the blade within the tube;
   a wrench pipe having exterior and interior ends, the interior end having a recess adapted to receive a wrench, a threaded pivot pin extending radially from the wrench pipe adjacent to the recess; and
   a slide having a blade end and a wrench end, the slide having an aperture adjacent to the blade end, a pivot bolt extending through the aperture and threadedly received in the tube, the slide having a slot slidably receiving the pivot pin.

2. The system as set forth in claim 1 wherein the pivot pin and pivot bolt are upwardly extending.

3. The system as set forth in claim 1 and further including:
   a socket removably received on a socket support extending upwardly from the wrench pipe adjacent to the pivot pin.

4. The system as set forth in claim 1 and further including:
   a wrench secured within the recess of the wrench pipe.

5. A blade removal assistance tool system (10) for removing locking nuts from mowing blade shafts, the system comprising, in combination:
   a lawn mower (14) having a blade (16) rotatable in a horizontal plane, a locking nut (18) removably coupling the blade to the lawn mower, the blade being rotatable about a vertical axis of rotation, the blade having a total length with half of the length extending from each side of the locking nut;
   a wrench (22) having a handle end (24) and a working end (26);
   a blade pipe (30) having an exterior end and an interior end, the exterior end adapted to be held by a user, the interior end having first and second rectangular tubes (32), (34), the tubes adapted to receive and support the blade, a blade supporting bolt (36) threadedly received in the first tube and adapted to retain the blade within the tubes, a downwardly facing threaded aperture (38) in the first tube;
   a wrench pipe (42) having an exterior end and an interior end, the exterior end adapted to be held by a user, the interior end having an axial recess (44) adapted to receive and support the handle end of the wrench, a wrench supporting bolt (46) threadedly received in the wrench pipe adapted to retain the wrench within the recess, a threaded pivot pin (48) radially extending upwardly from the wrench pipe adjacent to the recess, a socket support (50) extending upwardly from the wrench pipe adjacent to the pivot pin and a socket (52) removably received on the support;
   a flat slide (58) having a blade end and a wrench end, the slide having a slide aperture (60) adjacent to the blade end, a pivot bolt (62) radially extending upwardly through the slide aperture and received in the downwardly facing threaded aperture (38) of the first rectangular tube, the slide having a slot (64) between the wrench end and the aperture, the slot slidably receiving the pivot pin whereby motion of the exterior end of the blade pipe and the exterior end of the wrench pipe toward each other will effect pivoting of the blade pipe and the wrench around the locking nut with the concurrent sliding of the pivot pin within the slot along with the loosening of the locking nut with respect to the blade.

* * * * *